No. 635,791. Patented Oct. 31, 1899.
A. K. MANSFIELD.
INDICATOR APPARATUS FOR FLUID PRESSURE ENGINES.
(Application filed Nov. 30, 1898.)
(No Model.) 2 Sheets—Sheet 1.
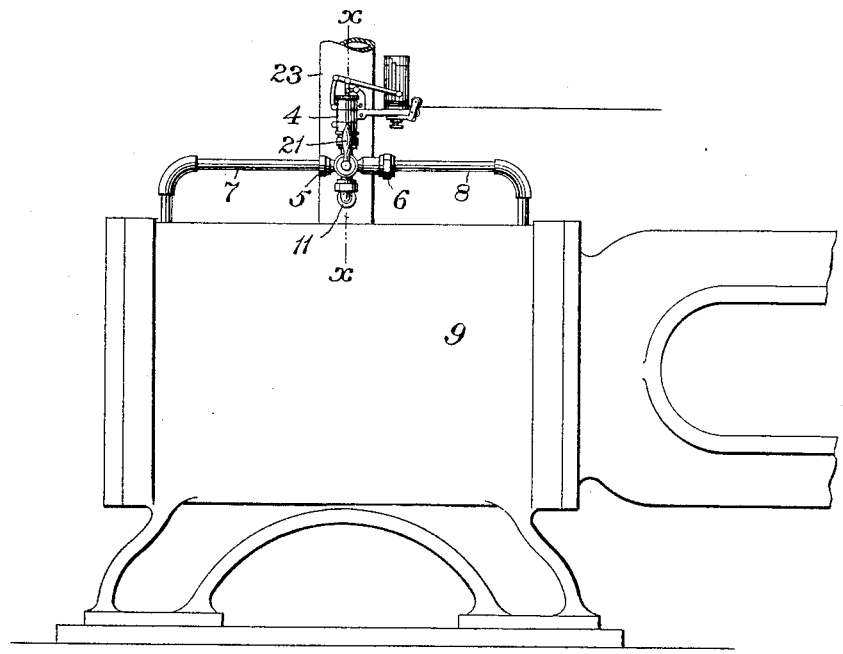
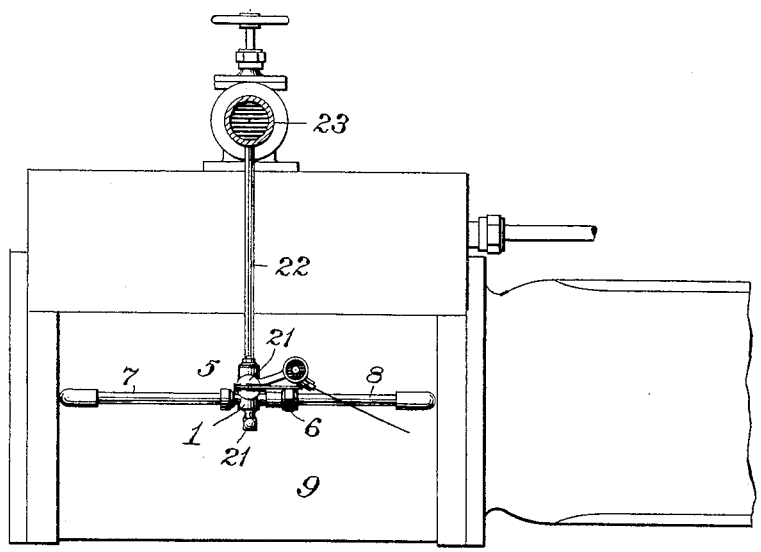
WITNESSES: INVENTOR,
Chas. F. Miller. Albert K. Mansfield,
Ethel Gallagher. by T. J. Hogan,
Att'y.

No. 635,791. Patented Oct. 31, 1899.
A. K. MANSFIELD.
INDICATOR APPARATUS FOR FLUID PRESSURE ENGINES.
(Application filed Nov. 30, 1898.)
(No Model.) 2 Sheets—Sheet 2.
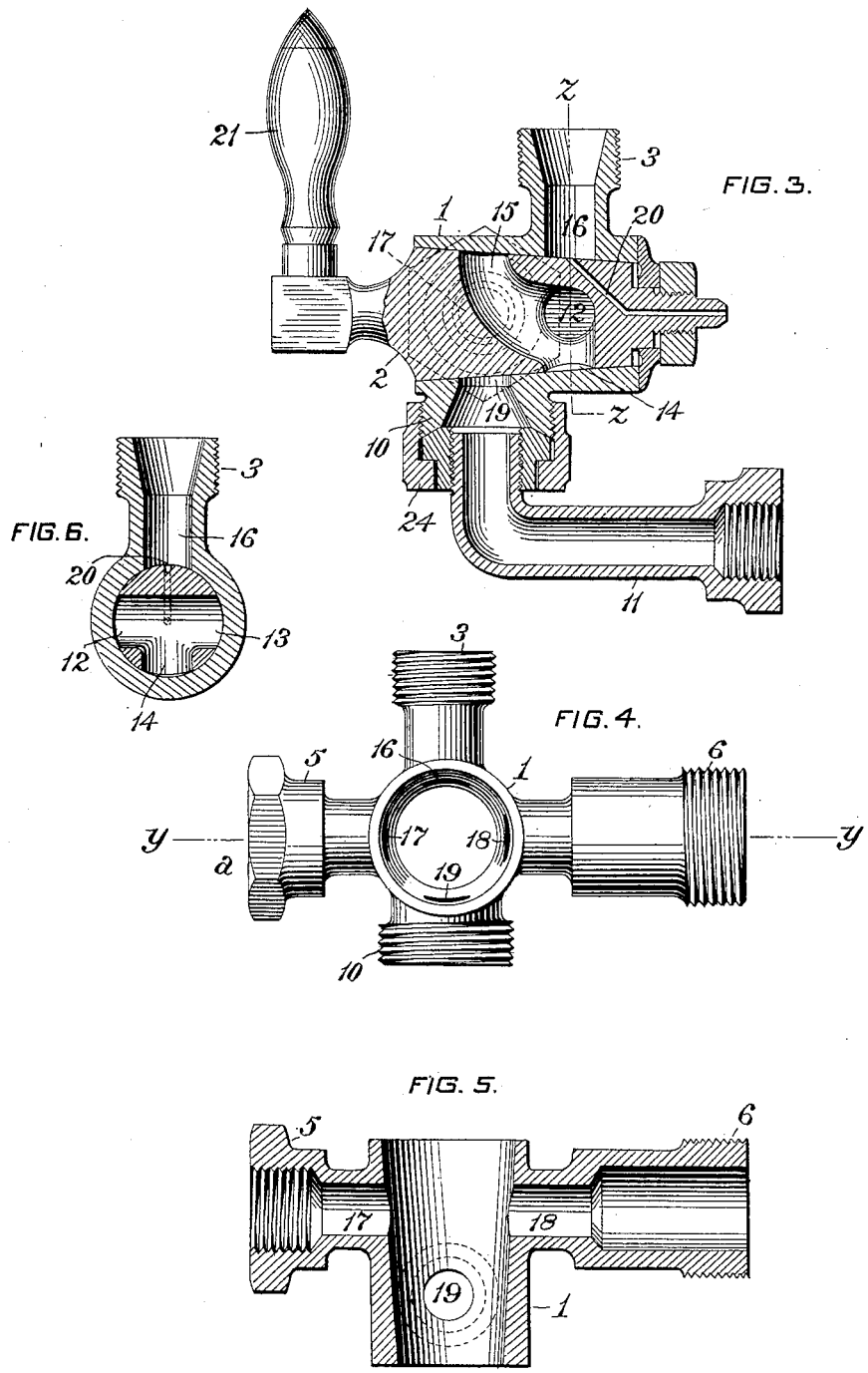
WITNESSES: INVENTOR,
Chas. F. Miller. Albert K. Mansfield,
Ethel Gallagher. by T. J. Hogan,
Att'y.

UNITED STATES PATENT OFFICE.

ALBERT K. MANSFIELD, OF SALEM, OHIO.

INDICATOR APPARATUS FOR FLUID-PRESSURE ENGINES.

SPECIFICATION forming part of Letters Patent No. 635,791, dated October 31, 1899.

Application filed November 30, 1898. Serial No. 697,874. (No model.)

*To all whom it may concern:*

Be it known that I, ALBERT K. MANSFIELD, a citizen of the United States, residing at Salem, county of Columbiana, State of Ohio, have invented or discovered a certain new and useful Improvement in Indicator Apparatus for Fluid-Pressure Engines, of which improvement the following is a specification.

The object of my invention is to provide an improvement in indicator apparatus for fluid-pressure engines; and to this end it consists in new and improved means for controlling communication to an indicator-cylinder, from the ends of the engine-cylinder, from the atmosphere, and from the steam or other fluid-supply outside of the distribution-valves.

In the accompanying drawings, which illustrate an application of my invention, Figure 1 is a side elevation, and Fig. 2 a plan view, of an engine-cylinder provided with indicating apparatus embodying my invention; Fig. 3, a section on the line $x\ x$ of Fig. 1 through the controlling valve or cock, which may be shifted so as to connect the indicator-cylinder with either end of the engine-cylinder, with the atmosphere, or with the steam or other fluid supply; Fig. 4, an elevation of the valve-casing and connections with the plug-cock removed; Fig. 5, a section on the line $y\ y$ of Fig. 4, looking in the direction of the arrow marked $a$; and Fig. 6, a section on the line $z\ z$ of Fig. 3.

The most common use of the indicator in connection with steam or other fluid-pressure engines is its employment for the purpose of obtaining cards indicating the variations of pressure occurring in the cylinder of the engine during forward and backward movement of the engine-piston, and for this purpose the indicator is usually connected to piping communicating with the ends of the cylinder, and the passage of motive fluid therethrough is usually controlled by a "three-way cock" near the center of the cylinder. The indicator is also often employed to indicate variations of pressure in the steam-supply pipe or steam-chest of engines, and these indications often throw much light on the indications obtained from the engine-cylinder and serve to correct or prevent false interpretations of the cylinder-diagrams and to locate faults outside of the engine, which if the cylinder-diagram alone be considered would appear to be faults in the engine. The connections of the indicator to the steam-supply for this purpose have heretofore been such that they necessitated the employment of a valve or valves additional to those already employed in the apparatus for taking cards from the engine-cylinder; but my improvement provides means whereby all of the connections of the indicator may be controlled by a single valve or four-way cock, thus reducing complication in construction and facilitating the use of the indicator.

As shown in the drawings, I employ a four-way cock, comprising a casing 1 and a plug-valve 2 fitted therein, the casing being connected by a nozzle 3 with the indicator-cylinder 4, by nozzles 5 and 6 with pipes 7 and 8, leading to the ends of the engine-cylinder 9, and by a nozzle 10 with a pipe 11, which is adapted to be connected with the steam-supply pipe, steam-chest, or, in case of a compound or multiple-expansion engine, with the receiver when the indicator is employed on a low-pressure or intermediate cylinder.

The plug-valve is formed, as shown in Figs. 3 and 6, with three connecting ports 12, 13, and 14 near the smaller end and with a port 15 near its larger end, which connects with the ports 12, 13, and 14. The casing 1 is provided with a port or passage 16, communicating with the interior of the indicator-cylinder 4, two ports or passages 17 and 18, communicating with the interior of the engine-cylinder 9 through the pipes 7 and 8, and a port or passages 19, communicating with the steam-supply through the pipe 11. A small passage 20 extends from one side of the cock through its smaller end and is open to the atmosphere. When the cock is in the position shown in Figs. 1 and 3, the indicator is cut off from communication with the steam-supply and with the ends of the engine-cylinder and is in communication with the atmosphere through the passages 16 and 20. When the handle 21 is turned to the left through an angle of ninety degrees from the position it occupies in Figs. 1 and 3, the port 15 in the plug 2 will register with the port 17 in the casing 1 and the port 13 in the plug will register with the port 16 in the casing. All other ports in the casing will then be closed, and the indicator-cylinder will then be in communication with the left-hand end of the engine-cylinder 9 through the ports and passages 16 13 15 17 and pipe 7. When the handle is turned ninety degrees to the right from the position it occupies in Figs. 1 and 3, the cylinder of the indicator will be connected with the right-hand end of the engine-cylinder 9 through the ports and passages 16 12 15 18 and pipe 8, and all other passages in the casing 1 will be closed. When the handle 21 is turned through one hundred and eighty degrees from the position it occupies in Figs. 1 and 3, the indicator-cylinder will be connected with the steam-supply through the ports and passages 16 14 15 19 and pipe 11, and all other passages in the casing will be closed.

As shown in the drawings, the curved pipe or elbow 11 is connected by means of a pipe 22 with the steam-supply pipe 23; but, as already stated, the connection may be to a steam-chest or to a receiver or to some other point in the steam-supply pipe. In order to provide for an easily-effected change in the direction of the pipe 11, it is connected with the casing 1 by means of a union-coupling 24, which forms a swivel-joint on which it may be turned.

I claim as my invention and desire to secure by Letters Patent—

1. The combination, with an engine-cylinder, a supply-pipe, or chamber, and an indicator, of a valve-casing having connections to the engine-cylinder, to the supply-pipe, and to the indicator, and a valve in the casing for controlling the connections.

2. The combination, with an engine-cylinder, and a supply-pipe, or chamber, of a valve-casing having ports or passages adapted to be connected with the engine-cylinder, with the supply-pipe, or chamber, and with an indicator, and a valve for controlling the ports or passages, and which is adapted to connect the indicator port or passage with the atmosphere.

3. The combination, with a valve-casing, of a plug-cock fitted therein, four ports in the casing, a passage in the plug-cock which is adapted to connect one of the ports with the atmosphere, and another passage which is adapted to connect the same port with either of the other three ports in the casing.

In testimony whereof I have hereunto set my hand.

ALBERT K. MANSFIELD.

Witnesses:
W. W. HOLE,
NELLIE CAMP.